(12) United States Patent
Xu et al.

(10) Patent No.: US 10,749,166 B2
(45) Date of Patent: Aug. 18, 2020

(54) ALL-SOLID-STATE LITHIUM RECHARGEABLE CELLS

(71) Applicants: Robert Bosch GmbH, Stuttgart (DE); Xiaoxiong Xu, Shanghai (CN); Xiayin Yao, Shanghai (CN); Gang Peng, Shanghai (CN); Longjie Zhou, Shanghai (CN); Yunhua Chen, Shanghai (CN)

(72) Inventors: Xiaoxiong Xu, Shanghai (CN); Xiayin Yao, Shanghai (CN); Gang Peng, Shanghai (CN); Longjie Zhou, Shanghai (CN); Yunhua Chen, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 181 days.

(21) Appl. No.: 15/770,718

(22) PCT Filed: Nov. 9, 2015

(86) PCT No.: PCT/CN2015/094126
§ 371 (c)(1),
(2) Date: Apr. 24, 2018

(87) PCT Pub. No.: WO2017/079873
PCT Pub. Date: May 18, 2017

(65) Prior Publication Data
US 2019/0067684 A1    Feb. 28, 2019

(51) Int. Cl.
| | |
|---|---|
| *H01M 4/36* | (2006.01) |
| *H01M 10/0525* | (2010.01) |
| *H01M 10/0585* | (2010.01) |
| *H01M 4/58* | (2010.01) |
| *H01M 4/587* | (2010.01) |
| *H01M 4/38* | (2006.01) |
| *H01M 4/62* | (2006.01) |
| *H01M 4/136* | (2010.01) |

(52) U.S. Cl.
CPC ........... *H01M 4/364* (2013.01); *H01M 4/136* (2013.01); *H01M 4/382* (2013.01); *H01M 4/386* (2013.01); *H01M 4/587* (2013.01); *H01M 4/5815* (2013.01); *H01M 4/62* (2013.01); *H01M 4/625* (2013.01); *H01M 10/0525* (2013.01); *H01M 10/0585* (2013.01)

(58) Field of Classification Search
CPC ......... H01M 10/0525; H01M 10/0585; H01M 4/136; H01M 4/364; H01M 4/382; H01M 4/386; H01M 4/5815; H01M 4/587; H01M 4/62; H01M 4/625
See application file for complete search history.

(56) References Cited

U.S. PATENT DOCUMENTS

| | | | |
|---|---|---|---|
| 5,162,175 A | 11/1992 | Visco et al. | |
| 2017/0117547 A1* | 4/2017 | Fanous | ................ H01M 4/364 |

FOREIGN PATENT DOCUMENTS

| | | |
|---|---|---|
| JP | 2013258080 A | 12/2013 |
| KR | 20140117189 | 10/2014 |

OTHER PUBLICATIONS

International Search Report for Application No. PCT/CN2015/094126 dated Jul. 26, 2016 (3 pages).
Sylvia, B. et al., "Multiple Redox Modes in the Reversible Lithiation of High-Capacity, Peierls-Distorted Vanadium Sulfide," Journal of the American Chemical Society, vol. 137, No. 26, Jun. 8, 2015, 44 pages.
Sun, R. et al., "Vanadium Sulfide on Reduced Graphene Oxide Layer as a Promising Anode for Sodium Ion Battery," Applied Materials & Interfaces, vol. 7, No. 37, Sep. 2, 2015, pp. 20902-20908.
Xu, X. et al., "Lithium reaction mechanism and high rate capability of VS4-graphene nanocomposite as an anode material for lithium batteries," Journal of Materials Chemistry A, vol. 2, No. 28, Mar. 5, 2014, pp. 10847-10853.
Rout, C.S. et al., "Synthesis and Characterization of Patronite Form of Vanadium Sulfide on Graphitic Layer," Journal of the America Chemical Society, 2013, vol. 135, pp. 8720-8725.

* cited by examiner

*Primary Examiner* — Lingwen R Zeng
(74) *Attorney, Agent, or Firm* — Michael Best & Friedrich LLP

(57) ABSTRACT

Provided is an all-solid-state lithium rechargeable cell, comprising: a) a cathode, wherein the cathode comprises: a1) a composite of VS4 and graphene; and a2) a solid catholyte; and b) a lithium-based anode. In particular, the all-solid-state lithium rechargeable cell of the present disclosure may exhibit high initial discharge capacities, high initial Coulombic efficiencies, good reversible capacities, excellent cycling stabilities, high energy densities as well as outstanding safeties.

10 Claims, 4 Drawing Sheets

ALL-SOLID-STATE LITHIUM RECHARGEABLE CELLS

BACKGROUND OF THE INVENTION

The present invention relates to an all-solid-state lithium rechargeable cell, also referred to as an "all-solid-state lithium rechargeable battery" (hereinafter abbreviated to "ASSLRB").

All-solid-state lithium rechargeable batteries contain exclusively solid materials, and in particular solid-state electrolytes. However, ASSLRBs having traditional oxide materials (such as $LiCoO_2$) as cathodes often suffer from low theoretical capacities, as well as high interfacial resistance and lows energy densities. Therefore, it is essential to develop new cathode materials for ASSLRBs, which possess high energy density on material level to meet the requirements for energy storage systems and/or electric vehicles.

SUMMARY OF THE INVENTION

After intensive study, the inventors have surprisingly found that a composite of $VS_4$ and graphene (hereinafter abbreviated to "$VS_4$/graphene composite") can be used to provide a novel cathode for all-solid-state lithium rechargeable batteries.

Based on such discovery, an all-solid-state lithium rechargeable cell is provided which comprises:
a) a cathode, wherein the cathode comprises:
a1) a composite of $VS_4$ and graphene;
a2) a solid catholyte; and
b) a lithium-based anode.

Optionally, the cathode may further comprise: a3) a conductive additive and/or a4) a binder.

Optionally, the cell may further comprise a solid electrolyte located between the cathode and the anode.

For the first time, the inventors propose that $VS_4$/graphene composite can be used in the cathodes of ASSLRBs. In particular, the inventors provide a novel ASSLRB by employing a $VS_4$/graphene composite in combination with a solid catholyte as the cathode, and employing a lithium-based material as the anode. Surprisingly, it is found that the ASSLRBs of the present disclosure exhibit high initial discharge capacities, high initial Coulombic efficiencies, good reversible capacities, excellent cycling stabilities, high energy densities as well as outstanding safeties.

These and other features, aspects and advantages of the present disclosure will become evident to those skilled in the art from the following description of various examples taken in conjunction with the accompanying drawings.

Figure 1A:
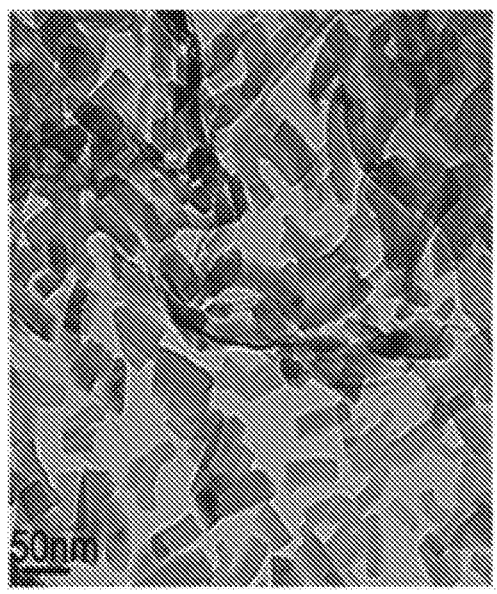
FIG. 1(a) is a transmission electron microscopy (TEM) image of a $VS_4$/graphene composite prepared according to an Example of the present disclosure.

These drawings are shown here to help illustrate various examples of the disclosure, and as such, are not necessarily drawn to scale.

DETAILED DESCRIPTION

Throughout this disclosure, all the scientific and technical terms, unless otherwise indicated, shall have the same meanings as those known to a person skilled in the art. Where there is inconsistency, the definition provided in the present disclosure should be taken.

It should be understood that the detailed description of all materials, processes, examples and drawings are presented for the purposes of illustration, and therefore, unless expressly specified otherwise, are not construed as limitations of the present disclosure.

Herein, the terms "cell" and "battery" may be interchangeably used. The terms "all-solid-state lithium rechargeable cell (or battery)" may also be abbreviated to "cell", "battery" or "ASSLRB".

Herein, the term "comprising" means that other ingredients or other steps which do not affect the final effect can be included. This term encompasses the terms "consisting of" and "consisting essentially of". The product and process according to the present disclosure can comprise, consist of, and consist essentially of the essential technical features and/or limitations of the present disclosure described herein, as well as any additional and/or optional ingredients, components, steps, or limitations described herein.

The use of the terms "a", "an" and "the" and similar referents in the context of describing the subject matter of this application (especially in the context of the following claims) are to be construed to cover both the singular and the plural, unless otherwise indicated herein or clearly contradicted by context.

The term "electrolyte" means an electrolyte located between the cathode and the anode. The term "catholyte" specifically means an electrolyte contained in the cathode. The "catholyte" and the "electrolyte" in the same cell may be formed from the same or different materials.

Unless otherwise specified, every numerical range in this context intends to include both endpoints and any numbers and sub-ranges falling within said numerical ranges.

Unless specially indicated, all materials and agents used in the present disclosure are commercially available.

Examples of the present disclosure are described in detail as follows.

a): Cathode

The cathode may comprise:
a1) a composite of $VS_4$ and graphene; and
a2) a solid catholyte.

Optionally, the cathode may further comprise: a3) a conductive additive and/or a4) a binder.

According to some examples of the present disclosure, the cathode comprises:
a1) 20-95 weight parts of the composite of $VS_4$ and graphene;
a2) 5-80 weight parts of the solid catholyte;
a3) 0-40 weight parts of the conductive additive; and
a4) 0-20 weight parts of the binder.

According to some examples of the present disclosure, the cathode comprises:

a1) 20-80 weight parts of the composite of $VS_4$ and graphene;

a2) 20-80 weight parts of the solid catholyte;

a3) 0-40 weight parts of the conductive additive; and a4) 0-20 weight parts of the binder.

a1): $VS_4$/Graphene Composite

According to some examples of the present disclosure, the cathode may comprise component a1): a $VS_4$/graphene composite as the cathode active material. Owing to the high theoretical capacity of $VS_4$ and the high conductivity of graphene, the $VS_4$/graphene composite exhibits a high energy density.

Preferably, the $VS_4$/graphene composite may have a structure that $VS_4$ particles chemically bond with or physically embed in graphene sheets. Preferably, $VS_4$ particles are uniformly distributed on the graphene sheets. Preferably, $VS_4$ is a vanadium sulfide in patronite form.

According to some examples of the present disclosure, the graphene is a reduction product of graphene oxide.

Preferably, $VS_4$/graphene composite is in the form of powders.

According to some examples of the present disclosure, the content of the graphene may be more than 0% by weight but no more than 20% by weight, and the content of the $VS_4$ particles may be no less than 80% by weight but less than 100% by weight, based on the total weight of the $VS_4$/graphene composite.

a2): Solid Catholyte

According to some examples of the present disclosure, the cathode may comprise component a2): a solid catholyte. The solid catholyte may advantageously improve the transport of lithium ions through the aforementioned $VS_4$/graphene composite and also through the whole cathode.

There is no specific limitation to the solid catholyte, and those which are known for use in lithium rechargeable batteries may be used so long as they are lithium ion-conducting materials. For example, the solid catholyte may be polyethylene oxide (PEO), a lithium ion-conducting sulfide, a lithium ion-conducting chloride or their combination. In some examples, the lithium ion-conducting sulfides may be composites comprising lithium sulfides and phosphorus sulfides, and the composite may be optionally doped with some oxides for modification, such as $Li_{10}GeP_2S_{12}$, $Li_3PS_4$, $Li_7P_3S_{11}$, $Li_8P_2S_9$, $Li_{3.25}Ge_{0.25}P_{0.75}S_4$, $Li_{10}GeP_2S_{12}$, 70 $Li_2S$-29 $P_2S_5$-1 $P_2O_5$, $Li_2S$—$P_2S_5$ and any combinations thereof. $Li_7La_3Zr_2O_{12}$ is another example of the solid catholyte.

Preferably, the solid catholyte is in the form of powders, or is ground into powders.

a3): Conductive Additive

Optionally, the cathode according to the present disclosure may comprise component a3): a conductive additive. The conductive additive may increase the conductivity and/or capacity of the cathode.

There is no specific limitation to the conductive additives, and those which are known for use in lithium rechargeable batteries may be used. Preferably, the conductive additive may be selected from carbon black, super P, acetylene black, Ketjen black, graphite, graphene, carbon nanotubes, vapour grown carbon fibers (VGCF) and their combinations; with super P being more preferable. For example, super P may be commercially available from Timical.

Preferably, the conductive additive is in the form of powders, or is ground into powders.

a4): Binder

Optionally, the cathode according to the present disclosure may comprise component a4): a binder. With the help of the binder, not only the components of the cathode are firmly bound together, but also the whole cathode is adhesively connected with the anode or solid electrolyte (if present). Such adhesion may suppress the volumetric change of the cathode as well as the whole ASSLRB during repeated charge/discharge cycles, and thus improves the electrochemical properties, especially the cycling performance of the ASSLRB.

Preferably, the binder may be selected from polyvinylidone fluoride (PVDF), polyacrylic acid (PAA) and their combination. Preferably, binders suitable for the present disclosure do not contain carboxymethyl cellulose (CMC) since CMC is often used in the form of an aqueous solution.

b): Anode

There is no specific limitation to the anode material suitable for the present disclosure, and those lithium-based electrode materials which are known for use in lithium rechargeable batteries may be used so long as they are compatible with and do not adversely influence the effect of the cathode according to the present disclosure. Examples of useful lithium-based anode include, but not limited to, lithium metal; lithium alloys, such as Li—In alloy; stacks consisting of a layer of lithium metal and one or more layers of other metals, such as Li—In stack; pre-lithiated graphite, for example, graphite which contains a desired amount of lithium intercalated or absorbed therein; pre-lithiated silicon, for example, silicon which contains a desired amount of lithium intercalated or absorbed therein.

For example, in the case where Li metal is used as the anode, the discharge capacity and discharge platform may be increased, and thus the energy density may be improved.

c): Solid Electrolyte

Optionally, the ASSLRBs according to the present disclosure may comprise a solid electrolyte located between the cathode and the anode. The solid electrolyte and the aforementioned solid catholyte may be formed from identical or different materials.

When compared with liquid electrolytes, solid-state electrolytes imparts several advantages to the ASSLRBs. For example, comparing with liquid-electrolyte lithium ion rechargeable batteries which inevitably contain at least 30 vol. % to 35 vol. % of pores, the ASSLRBs show the possibility of higher volumetric energy density since ASSLRBs could be 100% dense. The ASSLRBs could also show a higher gravimetric energy density because of the possible usage of high energy lithium-based anodes. The high operation temperature, e.g., about 80 to about 100° C., of ASSLRBs additionally contributes to an even higher energy density. In addition, higher safety is another important advantage of the ASSLRBs over liquid-electrolyte lithium ion rechargeable batteries.

In addition, the solid electrolyte may also serve as a separator between the cathode and anode. The solid electrolyte may also improve the transport of lithium ions between the cathode and the anode.

Furthermore, since the ASSLRBs of the present disclosure contain no liquid electrolyte, undesirable reactions between a liquid electrolyte and a cathode and/or an anode may thus be avoided and a higher level of safety is ensured.

There is no specific limitation to the solid electrolyte, and those which are known for use in lithium rechargeable batteries may be used so long as they are lithium ion-conducting materials. For example, the solid catholyte may be polyethylene oxide (PEO), a lithium ion-conducting sulfide, a lithium ion-conducting chloride or their combination. The examples described above for the solid catholyte also apply to the solid electrolyte.

Preferably, the solid electrolyte c) may be in the form of a single-layer. The solid electrolyte c) may also be in the form of a two-layer stack, or a multi-layer stack containing three or more layers, wherein these layers may be formed from identical or different layers, preferably from different layers. For example, the solid electrolyte may be a two-layer stack consisting of a layer of $Li_{10}GeP_2S_{12}$ and a layer of lithium sulfide-phosphorus sulfide-phosphorus oxide ($Li_2S$—$P_2S_5$—$P_2O_5$). Preferably, the lithium sulfide-phosphorus sulfide-phosphorus oxide may be 70 $Li_2S$-29 $P_2S_5$-1 $P_2O_5$. In the case where a two-layer or multi-layer stack is adopted for the solid electrolyte, a polarization phenomenon may be effectively solved.

All-Solid-State Lithium Rechargeable Battery

The all-solid-state lithium rechargeable cell is provided which comprises:
   a) a cathode, wherein the cathode comprises:
      a1) a composite of $VS_4$ and graphene;
      a2) a solid catholyte; and
   b) a lithium-based anode.

Optionally, the cathode may further comprise a solid electrolyte located between the cathode and the anode.

In addition, the ASSLRBs of the present disclosure may optionally contain further additives, so long as they do not adversely affect the electrochemical properties of the batteries. The further additives may be contained within or between any of the cathode, the anode and the solid electrolyte (if present).

The ASSLRBs according to the present disclosure may be used in energy storage systems and electric vehicles.

EXAMPLES

[Synthesis of Graphene Oxide Solution]

1.5 g of graphite powder (SP-1, Bay carbon) and 1.5 g of $KNO_3$ (Sigma Aldrich, ≥99.0%) were taken in 69 ml of $H_2SO_4$ (Sigma Aldrich, 98.0%) at 0° C., and 9 g of $KMnO_4$ (Sigma Aldrich, ≥99.0%) was added gradually. The mixture was then stirred at 35° C. for 6 h, and 120 ml of deionized (DI) water was added. After 15 min, the reaction was terminated by the addition of a solution of 300 ml of deionized water and 9 ml of $H_2O_2$ (SAMCHUN pure chemical, 34.5% extra pure), and the color of the mixture changed to yellow. The mixture was filtered and washed with 500 ml of HCl (SAMCHUN pure chemical, 10% by weight) solution. The resulting graphite oxide was suspended in 200 ml of distilled water again, followed by dialysis (dialysis membrane: Spectrum Laboratories, MWCO-21-14,000) to remove excess HCl. The graphite oxide is exfoliated to give about 2.15 mg/mL graphene oxide solution by a high-pressure homogenizer at 15,000 psi. After exfoliation, the solution was centrifuged at 400 rpm for 10 min to remove the non-exfoliated graphite oxide, and the top supernatant graphene oxide solution was used for the synthesis of $VS_4$/graphene composite.

[Synthesis of $VS_4$/Graphene Composite]

1.1 g of sodium orthovanadate ($Na_3VO_4$, Sigma-Aldrich, ≥90%) and 2.25 g of thioacetamide ($C_2H_5NS$, aladdin, ≥99%) were dissolved in 20 ml of deionized water. Then, 37 ml of graphene oxide solution (2.15 mg/ml) was added to the mixture and a total volume of the solution was adjusted to 80 ml. After that, the solution was transferred to a 100 ml Teflon-lined stainless steel autoclave and heated to 160° C. for 24 h. After cooling naturally, the product was filtered, washed with DI water, and dried in vacuum at 110° C. for 24 h.

[Determination and Characterization of the Structure of the $VS_4$/Graphene Composite]

The obtained sample was detected to demonstrate and characterize its structure. The detection results are summarized as below:

As shown in FIG. 1(a), the transmission electron microscopy (TEM) image indicates that the graphene is in the shape of sheets, and the $VS_4$ particles are uniformly distributed on the graphene sheets, with the lateral lengths of the $VS_4$ particles being 25-50 nm and the longitudinal lengths of the $VS_4$ particles being 50-200 nm. The TEM image was obtained on an FEI Tecnai $G^2$ F20 transmission electron microscopy at an accelerating voltage of 200 kV.

Figure 1B:
FIG. 1(b) is a high-resolution transmission electron microscopy (HRTEM) image of a $VS_4$/graphene composite prepared according to an Example of the present disclosure.

In the high-resolution TEM (HRTEM) image shown in FIG. 1(b), an interplanar distance of around 0.56 nm was observed, which matches well with the d(110) spacing of known monoclinic $VS_4$ [PDF No. 072-1294]. The HRTEM image was also obtained on an FEI Tecnai $G^2$ F20 transmission electron microscopy at an accelerating voltage of 200 kV.

Figure 2:
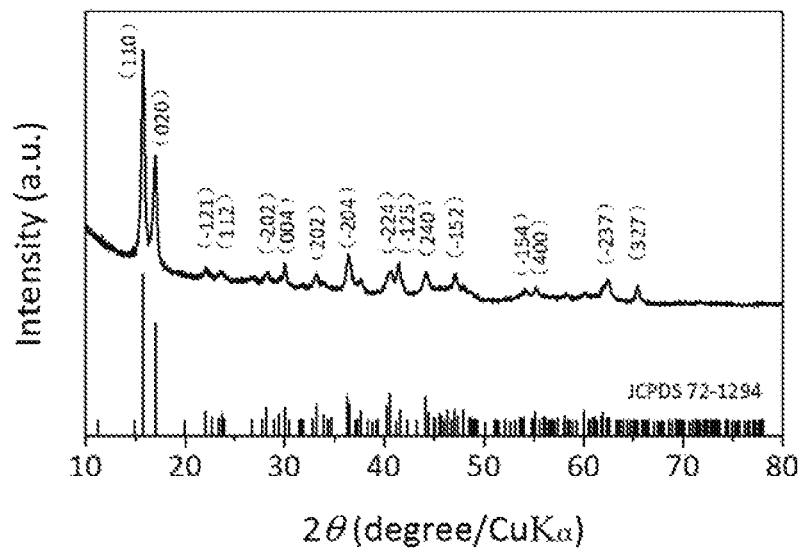
FIG. 2 is a X-ray diffraction (XRD) pattern of a $VS_4$/graphene composite prepared according to an Example of the present disclosure.

As shown in FIG. 2, The XRD pattern of the $VS_4$/graphene composite further confirms the formation of a monoclinic $VS_4$ phase since all peaks can be indexed to known monoclinic $VS_4$ [JCPDS No. 072-1294]. Furthermore, the diffraction peak corresponding to the (110) plane is present at 15.8°, corresponding to a distance of 0.56 nm, which is also consistent with the HRTEM result shown in FIG. 1(b). The XRD pattern was obtained on a D8-Advance (Bruker AXS, Germany) powder diffractometer, operated at a voltage of 40 kV and scanning from 10° to 80°.

In FIG. 2, no impurities or other phase were detected in the $VS_4$/graphene composite sample. The characteristic diffraction peaks for the graphene were not observed. It is presumably attributed to a low content of graphene in the final $VS_4$/graphene composite. The low diffraction intensity of graphene is also responsible for the lack of graphene peaks.

Therefore, the combination of FIG. 1(a), FIG. 1(b) and FIG. 2 clearly demonstrates and characterizes the structure of the $VS_4$/graphene composite.

Example 1

[Preparation of a Cathode]

45 mg of $VS_4$/graphene, 50 mg of solid electrolyte $Li_{10}GeP_2S_{12}$ and 5 mg of Super P (40 nm, available from Timical) were mixed together. The resultant mixture was ground by hand in a mortar placed in a glovebox under argon atmosphere so as to obtain a composite cathode material.

[Preparation of a Cell]

An all-solid-state cell for electrochemical measurements was fabricated as follow. The following two kinds of sulfide electrolytes (SEs): $Li_{10}GeP_2S_{12}$ and 70 $Li_2S$-29 $P_2S_5$-1 $P_2O_5$, were used to form a bilayer SE. The double SE layers was constructed by cold-pressing 50 mg 70 $Li_2S$-29 $P_2S_5$-1 $P_2O_5$ SE on the top of 100 mg of cold pressed $Li_{10}GeP_2S_{12}$ at 100 MPa, with the thickness of $Li_{10}GeP_2S_{12}$ layer being 0.67 mm, and the thickness of 70 $Li_2S$-29 $P_2S_5$-1 $P_2O_5$ layer being 0.23 mm. 5 mg of the composite cathode material was evenly spread on the top of the $Li_{10}GeP_2S_{12}$ SE layer and pelletized by cold-pressing at 100 MPa. Lithium foil was then attached to the 70 $Li_2S$-29 $P_2S_5$-1 $P_2O_5$ SE side at 200 MPa. Stainless steel plates were used as current collectors for both of the working electrode (i.e., the cathode) and the counter electrode (i.e., the anode). All pressing and experimental operations were done in a glovebox under argon. A cell is thus obtained.

[Electrochemical Measurements]

The cell thus obtained was galvanostatically cycled at room temperature within a voltage range of 0.5 to 3.0 V (vs. Li/Li$^+$) at a current density of 0.1 mA cm$^{-1}$. The cyclic voltammogram profiles and discharge/charge profiles of the cell in Example 1 were plotted in FIG. 3 and FIG. 4, respectively.

Figure 3:
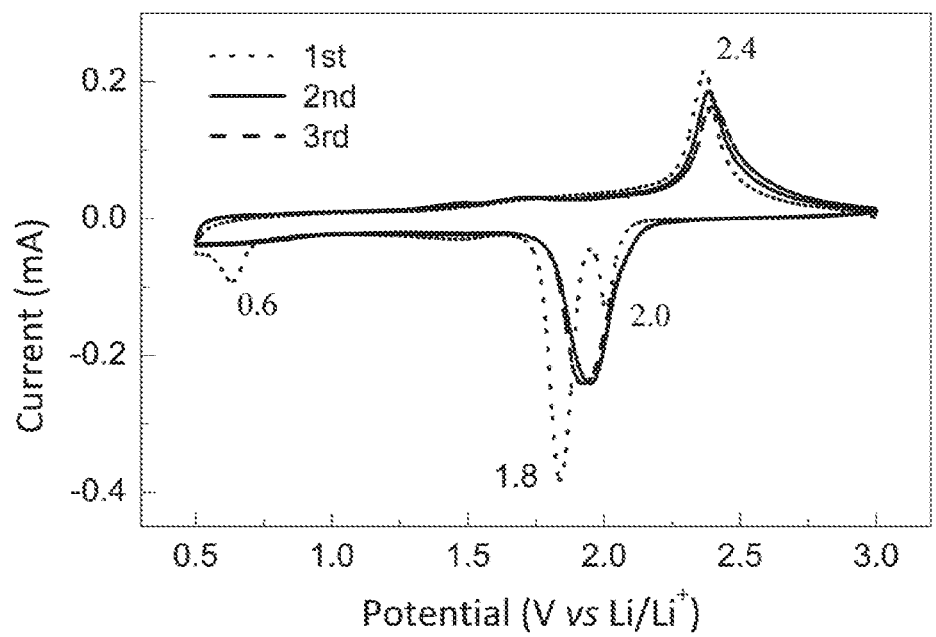
FIG. 3 shows the cyclic voltammogram profiles of an ASSLRB prepared according to an Example of the present disclosure.

FIG. 3 shows the cyclic voltammogram (CV) profiles of the cell prepared according to Example 1 of the present disclosure, measured in the voltage range of 0.5 to 3.0 V (vs Li/Li$^+$) at a scan rate of 0.1 mV s$^{-1}$ during the first three cycles.

Based on the CV test result and the discharge/charge profiles described later, the possible electrochemical reaction process of the VS$_4$/graphene in the ASSLRB is shown as follow:

At initial discharge (see the 1$^{st}$ discharge curve):

2.0 V: VS$_4$+3Li$^+$+3e$^-$→Li$_3$VS$_4$ 1.8/0.6 V: Li$_3$VS$_4$+5Li$^+$+5e$^-$→4Li$_2$S+V

Followed by (see the 1$^{st}$ to 3$^{rd}$ charge curves, as well as the 2$^{nd}$ and 3$^{rd}$ discharge curves):

1.9V/2.4 V: Li$_2$S↔S+2Li$^+$+2e$^-$

Figure 4:
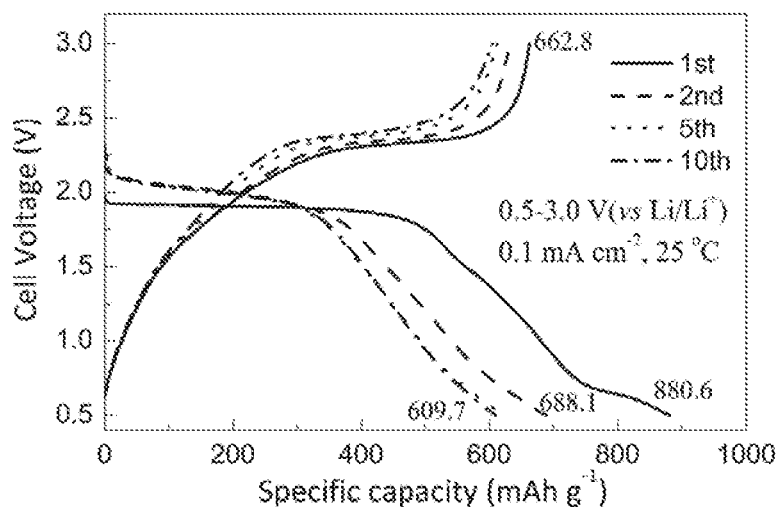
FIG. 4 shows the discharge/charge profiles of an ASSLRB prepared according to an Example of the present disclosure.

FIG. 4 shows the discharge/charge profiles of the cell prepared according to Example 1 of the present disclosure, measured in a voltage range of 0.5 to 3.0 V (vs Li/Li$^+$) at a current density of 0.1 mA cm$^{-1}$ during the 1$^{st}$, 2$^{nd}$, 5$^{th}$, and 10$^{th}$ cycles. The ASSLRB has initial discharge/charge capacities of 880.6/662.8 mAh/g, corresponding to an initial Coulombic efficiency (CE) of 75.3%.

Figure 5:
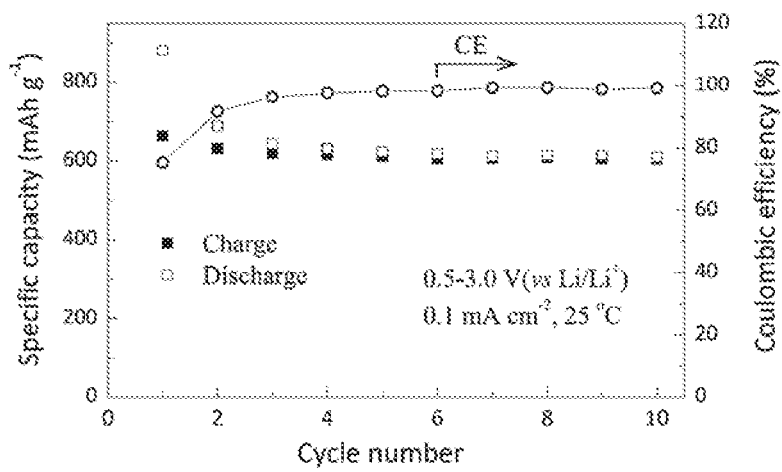
FIG. 5 shows the cycling performances of an ASSLRB prepared according to an Example of the present disclosure.

FIG. 5 shows the cycling performances of the ASSLRB prepared according to Example 1 of the present disclosure. By referring FIG. 4 and FIG. 5, it can be seen that the CE is greatly improved after the first cycle, achieving 92% and 96% for the 2nd and 3rd cycles. At the same time, the discharge capacities for the 2nd and 3rd cycles are 688.1 and 642.9 mAh respectively. The cell still retains a high reversible discharge capacity of 609.7 mAh g$^{-1}$ even after 10 cycles at 0.1 mA cm$^2$. The CEs are approximately 100% after from 4 to 10 charge/discharge cycles.

Example 2

An ASSLiB was prepared in the same way as described above for Example 1, except that the weight ratio of VS$_4$/graphene: Li$_{10}$GeP$_2$S$_{12}$: Super P in the cathode is 5:5:0.

The electrochemical properties of the ASSLiB were measured in the same way as described above for Example 1. The measurement result is depicted in FIG. 6.

Figure 6:
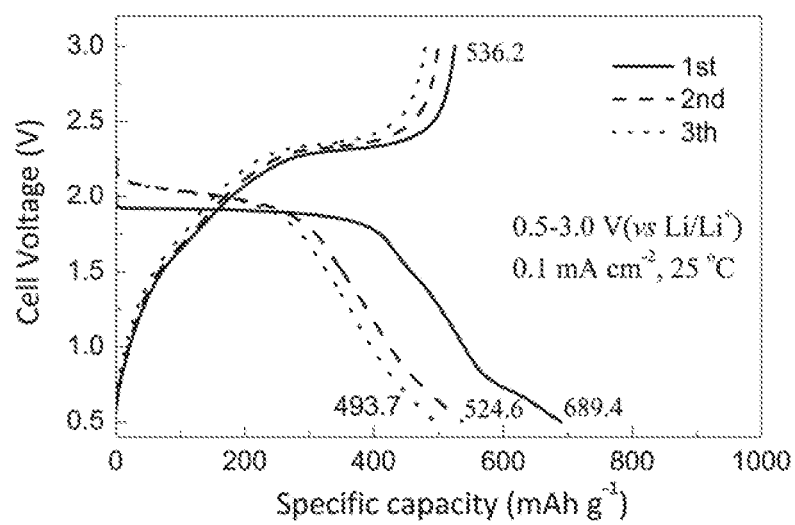
FIG. 6 shows the discharge/charge profiles of an ASSLRB prepared according to an Example of the present disclosure.

FIG. 6 shows that the cell has a high initial CE of 77.8%, and a high discharge capacity of 689.4 mAh g$^{-1}$ at current density of 0.1 mA cm$^2$.

Example 3

An ASSLiB was prepared in the same way as described above for Example 1, except that the weight ratio of VS$_4$/graphene: Li$_{10}$GeP$_2$S$_{12}$: Super P in the cathode is 3:6:2.

The electrochemical properties of the ASSLiB were measured in the same way as described above for Example 1. The measurement result is depicted in FIG. 7.

Figure 7:
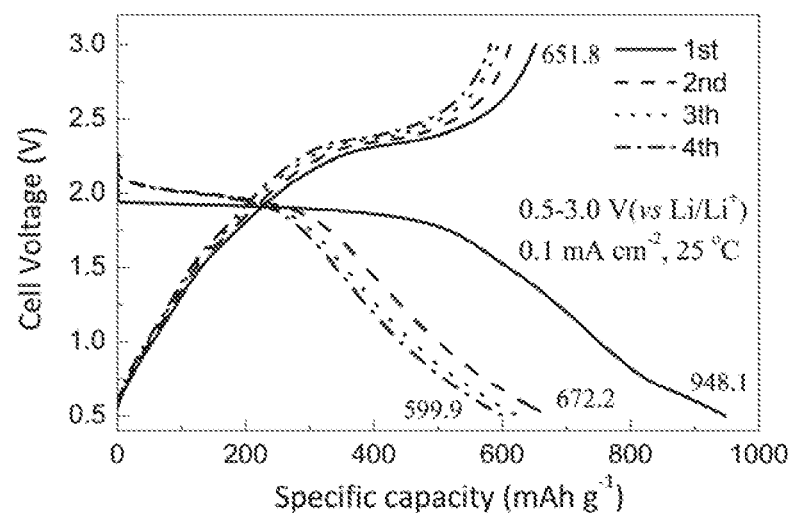
FIG. 7 shows the discharge/charge profiles of an ASSLRB prepared according to an Example of the present disclosure.

FIG. 7 shows that the cell has a high initial discharge capacity of 948.1 mAh g$^{-1}$ and a high initial CE of 68.7% at current density of 0.1 mA cm$^{-2}$.

It can be seen that the ASSLRBs according to the present disclosure achieve high initial CEs and initial discharge capacities. Furthermore, the cycling performances of the ASSLRBs according to the present disclosure are also excellent.

Many modifications and variations of this disclosure can be made without departing from its spirit and scope, as will be apparent to those skilled in the art. The specific embodiments described herein are offered by way of example only, and the disclosure is to be limited only by the terms of the appended claims, along with the full scope of equivalents to which such claims are entitled.

The invention claimed is:

1. An all-solid-state lithium rechargeable cell, comprising:
   a) a cathode, wherein the cathode comprises:
      a1) a composite of VS$_4$ and graphene; and
      a2) a solid catholyte; and
   b) a lithium-based anode.

2. The all-solid-state lithium rechargeable cell according to claim 1, wherein the composite of VS$_4$ and graphene has a structure that VS$_4$ particles chemically bond with or physically embed in graphene sheets.

3. The all-solid-state lithium rechargeable cell according to claim 1, wherein the graphene is a reduction product of graphene oxide.

4. The all-solid-state lithium rechargeable cell according to claim 1, wherein the catholyte is selected from polyethylene oxide, a lithium ion-conducting sulfide, a lithium ion-conducting chloride and their combinations.

5. The all-solid-state lithium rechargeable cell according to claim 1, wherein the lithium-based anode is selected from the group consisting of lithium metal, lithium alloys, pre-lithiated graphite, pre-lithiated silicon, stacks consisting of a layer of lithium metal and one or more layers of other metals, and their combinations.

6. The all-solid-state lithium rechargeable cell according to claim 1, wherein the cathode further comprises: a3) a conductive additive.

7. The all-solid-state lithium rechargeable cell according to claim 1, wherein the cathode further comprises: a4) a binder.

8. The all-solid-state lithium rechargeable cell according to claim 1, further comprising: c) a solid electrolyte located between the cathode and the anode, wherein the solid electrolyte and the solid catholyte are formed from identical or different materials.

9. The all-solid-state lithium rechargeable cell according to claim 1, wherein the cathode comprises:
   a1) 20 to 95 weight parts of the composite of VS$_4$ and graphene;
   a2) 5 to 80 weight parts of the solid catholyte;
   a3) 0 to 40 weight parts of the conductive additive; and
   a4) 0 to 20 weight parts of the binder.

10. The all-solid-state lithium rechargeable cell according to claim 1, wherein the content of the graphene is more than 0% by weight but no more than 20% by weight, based on the total weight of the composite of VS$_4$ and graphene.

* * * * *